March 12, 1940. D. G. GRISWOLD 2,193,720
PILOT CONTROLLED DIAPHRAGM VALVE
Filed May 17, 1937

Inventor
Donald G. Griswold

Patented Mar. 12, 1940

2,193,720

UNITED STATES PATENT OFFICE 2,193,720

PILOT CONTROLLED DIAPHRAGM VALVE

Donald G. Griswold, Alhambra, Calif., assignor to Clayton Manufacturing Company, a corporation of California Application May 17, 1937, Serial No. 143,077

9 Claims. (Cl. 137—139)

The invention relates generally to valves and more particularly to that type of valve in which the main valve is in the form of a diaphragm which is held in closed position by fluid pressure in a chamber on one side of the valve, the entrance and escape of fluid from the chamber being controlled by an auxiliary or pilot valve.

It is a primary object of this invention to provide a pilot controlled diaphragm valve which will positively control a fluid stream of any volume or pressure so that the stream is entirely free to flow or is positively stopped from flowing and which requires only a very small operating force for actuation which is not affected by the volume or pressure of the fluid stream being controlled.

More especially it is an object of this invention to provide a valve of the type indicated, which requires only a very small valve actuating force to control a large stream of fluid regardless of the volume and pressure of the stream of fluid to be controlled. It is also an object of this invention to provide a valve in which the force required to operate the valve remains constant and is not affected in any manner by the volume or pressure of the fluid to be controlled. It is a further object of this invention to provide a valve in which the force required to operate the valve remains constant over a period of time and does not tend to stick or require increased force to move it as it ages, wears, or corrodes.

Furthermore, it is an object of this invention to provide a valve which is positive in operation, that is, a valve that is either wide open or completely closed at any given time and which is incapable of being cracked partially open and held in that position. In this connection it is also an object of this invention to provide a valve which will not flutter, or oscillate between an open and closed position.

These and other objects are apparent from the accompanying drawing and the following description. Referring to the drawing, which is for illustrative purposes only, Fig. 1 is a longitudinal sectional elevation of a valve embodying one form of my invention. This form is particularly suitable for controlling fluid in pipes of relatively small diameter.

Figure 1:
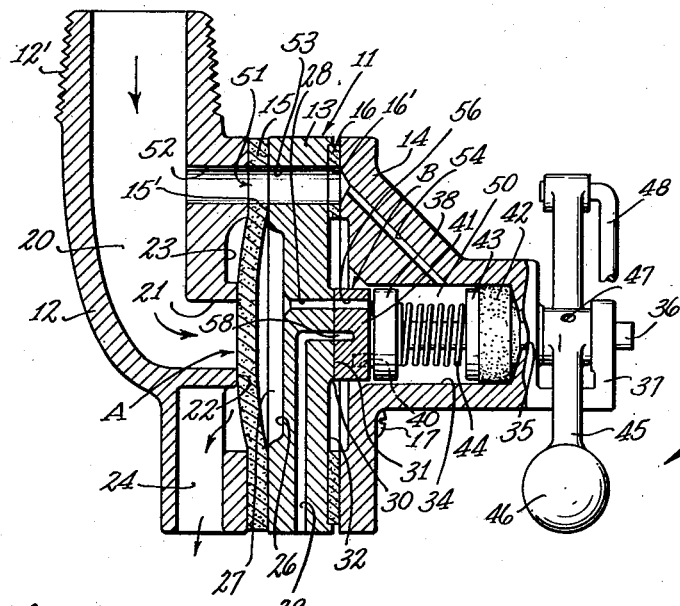

The valve of this invention comprises a main diaphragm valve member generally indicated by reference letter A, which is adapted to be closed by the pressure of the fluid being controlled, and to accomplish this there is provided behind the diaphragm what may be termed a valve chamber. The entrance and escape of fluid to this chamber, and consequently the operation of the main diaphragm valve is controlled by a pilot valve, or auxiliary valve, generally indicated by reference letter B.

Referring more particularly to the drawing, reference numeral 11 generally indicates a valve body which comprises a fluid intake section 12, a central section 13 and a rear, or pilot housing section 14. Interposed between the sections 12 and 13 is a diaphragm valve member 15 which also serves to act as a sealing means between the two sections. Between sections 13 and 14 is a gasket 16 of any suitable material. The three sections comprising the valve body are suitably held together by screws 17 which extend through openings in sections 13 and 14 and are threaded into the section 12.

The intake section 12 is provided with an externally threaded inlet 12' on which may be threaded a fluid conduit (not shown) which may carry the fluid to be controlled. The section 12 has a passage 20 formed therein which terminates in an opening 21 of less diameter. The inner end of the passage 20 constitutes a valve seat 22 which is adapted to be engaged by the diaphragm 15 when the valve is in closed position as shown in Fig. 1. Surrounding the valve seat 22 is an annular recess 23 which is in open communication with an outlet or discharge passage 24 in the section 12.

The central section 13 is provided with a circular recessed face 26 on its front side, which, together with the diaphragm 15 provides a valve chamber 27. Communicating with this chamber is a bore 28 which extends through the central section. This section is also provided with what may be termed a fluid escape passage 29, the purpose of which will subsequently be fully described.

The rear side of the central section 13 has a central circular hub or raised portion 30 which is surrounded by an annular depressed portion 42. The hub has a machined surface or valve face 31.

The pilot housing section or rear section 14 has a central bore 34 which is adapted to accommodate the pilot valve generally indicated by B. Bore 34 terminates at its outer end in a bore 35 of less diameter. Extending through the bore 35 is a rotatably mounted shaft 36 which, at its outer end, extends through the bracket portion 37 of the rear section 14 of the valve body.

Mounted on the inner end of the shaft 36 is a drive washer 38 which has drive pins 39 adapted to extend into holes 40 in the valve disc 41. Mounted on the shaft 36 is a packing 42 backed by a washer 43. Interposed between the drive washer 38 and the washer 43 is a compression spring 44 which serves to press or yieldably hold the valve disc 41 against the machined face 31 of the central section 13 of the valve body. For the purpose of actuating the shaft 36 there is provided a lever arm 45 which has a small counterweight 46 attached at one end. This arm is adjustably fixedly mounted on the shaft 36 by means of the set screw 47. The arm 45 may be actuated by any suitable force operating through the rod 48 or any other suitable connection.

That portion of the bore 34 between the valve disc 41 and the packing 42 constitutes a pressure chamber 50 which is under substantially the same pressure as the pressure of the fluid in inlet passage 20. For the purpose of providing fluid pressure in this chamber 50 a diversion passage or by-pass, generally indicated by reference numeral 51, is provided which establishes open communication between the chamber 20 and the chamber 50. This passage is comprised of the three passages 52, 53, and 54 in the three sections 12, 13 and 14 respectively. The diaphragm 15 and gasket 16 are apertured at 15' and 16' respectively to permit passage of fluid through the by-pass 51.

For the purpose of controlling the entrance and escape of fluid from the valve chamber 27 the valve disc 41 is provided with passages 56 and 56' which extend entirely through the valve disc. In actual operation only one of the passages is used and the purpose of providing two passages is that with this construction either "right" or "left" hand operation of the valve is possible, as will subsequently be evident.

The valve disc is also provided with a U-shaped passageway 57 which has an opening 58 on the inner face of the disc in the center thereof, and has another opening 59 between the inner end of passages 56 and 56' and radially spaced from the central opening 58 a distance equal to the space between either of the passages 56 and 56' and the central opening 58. For the purpose of lubrication, the disc is also provided with the three openings 60 which in practice are packed with grease.

When the valve is assembled the opening 58 registers with the inner end of passage 29. Either of passages 56 and 56' and the opening 59 of the passage 57 are adapted to register with the passageway 28 when the disc is rotated to the proper position.

Figure 2:
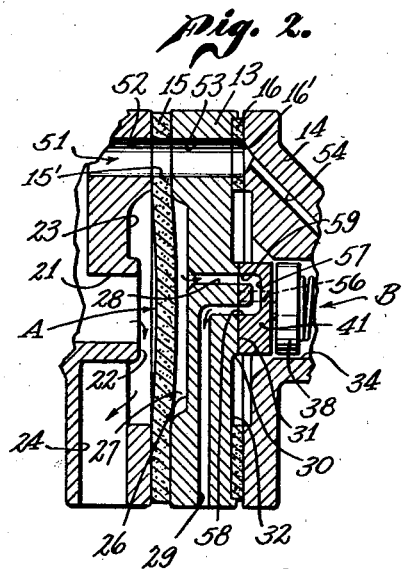
Fig. 2 is a fragmentary sectional elevation of the valve shown in Fig. 1 illustrating the valve in open position.
Figure 3:
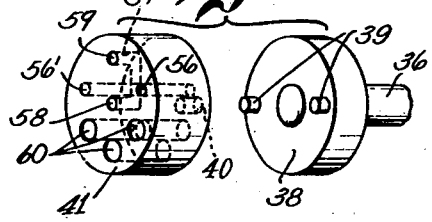
Fig. 3 is a perspective view of the valve disc and disc drive washer of the pilot valve.

The operation of the device shown in Figs. 1 and 2 is as follows:

When the valve disc 41 is rotated by means of a small actuating force on the lever arm 45 so that passage 56 (or 56') registers with the passage 28, the valve chamber 27 is under substantially the same pressure as the pressure of the fluid being controlled. The reason for this is that fluid is diverted from inlet passage 20 through the by-pass 51 into chamber 50 and through the passages 56 and 28 into the valve chamber 27. The fluid escape passage 29 is closed by reason of the fact that opening 58 of passage 57 is sealed against the face 31.

The pressure in valve chamber 27 is effective to close the main diaphragm valve, as shown in Fig. 1, by reason of the relatively large area of the diaphragm against which the fluid pressure is exerted, as compared with the relatively small area against which fluid pressure operates on the opposite side of the diaphragm 15, namely an area corresponding to the cross sectional area of the opening 21. In this connection it is pointed out that the portions of the diaphragm outwardly of the valve seat 22 are at atmospheric pressure by reason of the communicating outlet passage 24.

When it is desired to open the main valve A the lever 45 is rotated a distance sufficient to cause the opening 59 of passageway 57 to register with the passage 28, thereby permitting escape of pressure fluid in valve chamber 27 outwardly through the passages 28, 57 and 29, as may readily be seen in Fig. 2. Since the pressure in chamber 27 is thereby reduced to that of atmospheric pressure, the pressure of the fluid in conduit 18 and passageway 20 is effective to open the main valve A for forcing the diaphragm away from its seat 22.

The counterweight 46 serves to balance the dead weight of the rod 48. In this connection it is to be understood that the pilot valve remains in whatever position it is placed unless some outside force moves it, as for example a force exerted on the lever arm 45. The fluid pressure has no effect toward movement of the pilot valve.

It should be apparent from this description that the main diaphragm A will be entirely open or entirely closed and cannot be cracked partially open. It should also be apparent that the operation of the pilot valve B is not affected by the pressure of the fluid being controlled and requires only a very slight force for its actuation. In this connection it has been found that valves made similar to the valves shown and described in this application operate successfully with only an ounce or two of pressure on the actuating lever when controlling fluid pressure is 100 pounds.

The form of the valve shown in Fig. 1 is particularly designed for controlling the entrance of fluid to a tank and the discharge passage 24 is shown as discharging directly at the periphery of the valve body. Passage 29 has also been shown as discharging directly at the periphery of the valve body. The pressure in passages 24 and 29 has thus been described as "atmospheric". However, the passage 24 might be enlarged and threaded to accommodate a discharge conduit in the event that the valve is located at some point not directly over a receptacle, such as a tank, as would be the case if the valve were used in a pipe line. Also the outlet of passage 29 might be connected to the discharge passage. In such a case the pressure would necessarily be greater than "atmospheric" in each case. This construction is shown in a modified form of valve in Fig. 4.

Figure 4:
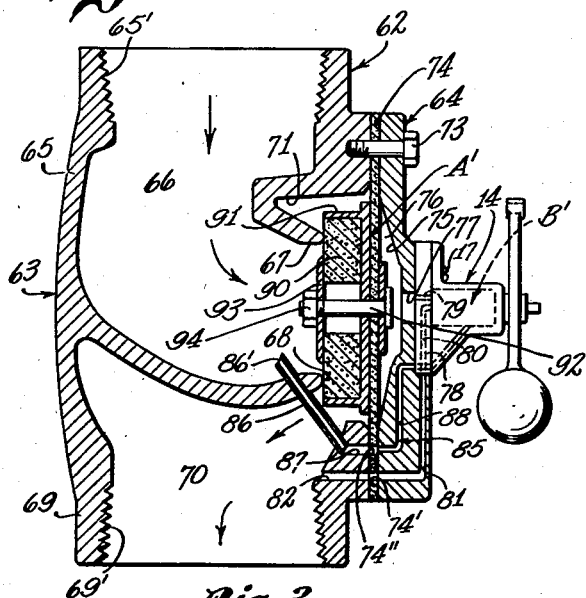
Fig. 4 is a sectional elevation of a form of the invention particularly suitable for use in controlling fluid in pipes of relatively large diameter.

In Fig. 4 there is illustrated a form of valve which is particularly adapted for use on pipes of relatively large diameter as compared to pipes upon which the valve shown in Fig. 1 is adapted to be used. This valve comprises a main valve A' and pilot valve B' as in the other form of valve.

Referring particularly to Fig. 4, reference numeral 62 generally indicates a main valve body which is comprised of the sections 63 and 64. In this form of the invention the parts which are similar to the parts of the valve illustrated in Fig. 1 will be designated by like numerals. Section 63 has an inlet portion 65 which is internally threaded at 65' to receive a pipe carrying the fluid to be controlled. The inlet portion 65 has an inlet passage 66 which converges inwardly and terminates at its inner end in an opening 67 formed within a circular valve seat 68.

At the opposite end of the section 63 there is provided an outlet portion 69 internally threaded at 69' and forming the discharge passage 70. Substantially surrounding the valve seat 68 is a circular recess 71 which is in open communication with the discharge passage 70.

Secured to the section 63 by means of suitable screws 73 is the section 64. Interposed between the two sections 63 and 64 and acting as a sealing means therebetween is the diaphragm member 74 which corresponds to the diaphragm 15 in Fig. 1. Behind the diaphragm the member 64 is recessed at 75 to provide what may be termed a valve chamber 76 which is formed by the diaphragm and the recessed portion of the member 64. The section 64 is provided with a central opening 77 therethrough which establishes communication between the valve chamber 76 on the one side of the member 64 and a plate 78 on the other side.

The plate 78 and the member 14 are secured to the rear face of the member 64 by means of suitable screws, one of which appears at 17, in a manner similar to the way in which the sections 13 and 14 are secured to the section 12 of Fig. 1. Suitable gaskets (not shown), such as one similar to the gasket 16 in Fig. 1, are interposed between the above mentioned members. The section 14 is in all respects similar to the section 14 of Fig. 1, except that it is shown turned at 180 degrees to the position it is shown in in Fig. 1, and except for the fact that the bracket member 37 has also been eliminated. The pilot valve structure and connecting parts are the same as in Fig. 1.

The plate 78 is provided with a passageway 79 therethrough and is also provided with a fluid escape passage 80. These passages are similar to the passages 28 and 29 of Fig. 1. In this form of the invention however, passage 80 terminates at its outer end in registration with a passage 81 in the member 64. The passage 81 communicates with passage 82 in member 63 which has its outlet in discharge passage 70 of outlet portion 69 of section 63. The diaphragm 74 is suitably apertured at 74' so as not to obstruct passage of fluid from passage 81 to passage 82. Thus the fluid escape passage from chamber 76 communicates with the discharge passage 70 of the section 63.

For providing fluid pressure in the chamber 50 of the section 14 for the purpose of closing the valve A' a by-pass means 85 is provided. By reason of the fact that the difference in pressure between passage 66 and passage 70 on opposite sides of the diaphragm valve A' is slight in this form of the invention where the outlet portion 69 is connected to a discharge pipe and is not at atmospheric pressure, as in the form of the invention shown in Fig. 1. the by-pass means is preferably formed with its intake opening opposed to the directional flow of the fluid stream in order to secure maximum pressure in the chamber 50. To accomplish this a tube 86 is provided which has its inner end 86' extending into the restricted portion of passage 66. This tube is mounted in the passage 87 in the section 63 in any suitable manner, as by brazing. A passage 88, which registers with passage 87 at one end and which registers with passage 54 at its other end is provided in the section 64. The diaphragm 74 is also suitably apertured at 74" so as not to prevent passage of fluid from passage 87 to passage 88. By this construction it is possible to utilize the velocity of flow of incoming fluid through the opening 67 when the valve is in open position in order to secure maximum pressure in the chamber 50. It is thus possible to operate, that is, to close this valve against the incoming fluid even though the difference in pressure between chambers 66 and 70 is slight.

With this type of valve, wherein the valve seat 68 is of relatively large diameter as compared with the valve seat in smaller forms of the valve, it has been found advisable to reinforce the diaphragm with a renewable disc valve member adapted to engage the valve seat. Thus a disc valve member 90 is provided which is held in place in a rigid housing 91. These members are secured to the diaphragm 74 by means of the bolt 92, washer 93, and nut 94. This construction provides more positive seating of the valve against the valve seat and also makes possible renewal of the portion of the valve which engages the valve seat without the necessity of renewing the diaphragm.

The operation of the valve shown in Fig. 4 is the same as the operation of the valve shown in Figs 1 and 2, the pilot valve B' of Fig. 4 being in all respects similar to the pilot valve B of Fig. 1.

I claim as my invention:

1. A pilot valve mechanism for controlling a diaphragm type valve comprising: a valve casing having a pressure chamber formed therein; a passageway in said casing for admitting fluid under pressure into said pressure chamber; and a pilot valve seated against one wall of said pressure chamber for controlling the flow of pressure fluid from said chamber to a diaphragm valve, said wall having a port extending therethrough for the passage of fluid to and from said diaphragm valve, said pilot valve having a pair of spaced passageways extending therethrough, each adapted to register with said port to permit flow of pressure fluid from said pressure chamber to said diaphragm valve upon shifting of said pilot valve in opposite directions from a given position, said pilot valve also having a passageway for registering with said port to permit said fluid to flow from said diaphragm valve.

2. A pilot valve mechanism for controlling a diaphragm type valve comprising: a casing having a pressure chamber formed therein; a passageway through said casing for admitting fluid under pressure into said pressure chamber; and a pilot valve seated against one wall of said pressure chamber for controlling the flow of pressure fluid from said chamber to a diaphragm valve, said wall having a port extending therethrough for the passage of fluid to and from said diaphragm valve, said pilot valve having a pair of spaced passageways extending therethrough, each adapted to register with said port upon shifting of said pilot valve in opposite directions from a given position to permit pressure fluid to flow to said diaphragm valve, said wall having a second port formed therein and vented to the atmosphere, said pilot valve having a second passageway arranged to establish communication between said ports when said pilot valve is in said given position to permit said pressure fluid to flow from said diaphragm valve.

3. A valve comprising, one end section having inlet and outlet openings and a valve seat intermediate said openings; a second section aligned with said end section to form a valve chamber; a diaphragm structure clamped between said end and said second sections arranged to provide a seal with said valve seat; a third section aligned with said second section and having a pressure chamber formed therein; said second section having a port extending therethrough for establishing communication between said valve and pressure chambers, said second section having a second port therein vented to the atmosphere; means for conducting pressure fluid to said pressure chamber; a pilot valve in said pressure chamber, said pilot valve having a passageway positioned to register with said first port to admit pressure fluid into said valve chamber to apply pressure to said diaphragm to form a seal with said seat, said pilot valve having a second passageway for establishing communication between said first and second ports to exhaust the fluid from said valve chamber to the atmosphere, thereby relieving the pressure on said diaphragm and establishing communication between said inlet and outlet openings.

4. A valve comprising, one end section having inlet and outlet openings and a valve seat intermediate said openings; a second section aligned with said end section to form a valve chamber; a diaphragm clamped between said end and said second sections, said diaphragm having a renewable disc secured thereto for providing a seal with said valve seat; a third section aligned with said second section and having a pressure chamber formed therein; said second section having a port extending therethrough for establishing communication between said pressure and valve chambers, said second section having a second port therein for exhausting spent pressure fluid from said valve chamber; means for conducting pressure fluid to said pressure chamber; a pilot valve in said pressure chamber, said pilot valve having a passageway adapted to register with said first port to admit pressure fluid into said valve chamber to apply pressure to said diaphragm to engage said renewable disc with said seat to form a seal, said pilot valve having a second passageway for establishing communication between said first and second ports to exhaust fluid from said valve chamber, thereby relieving the pressure on said diaphragm and permitting movement thereof away from said seat to establish communication between said inlet and outlet openings.

5. A valve comprising, a housing having inlet and outlet openings; a valve seat intermediate said openings; a diaphragm structure arranged to provide a seal with said valve seat; a valve chamber in said housing, said diaphragm being arranged so that a portion thereof forms one side wall of said valve chamber; a pressure chamber adjacent said valve chamber; a wall separating said pressure and valve chambers, one face of said separating wall confronting said diaphragm and forming another side wall of said valve chamber, said face having a shallow cavity formed therein to receive pressure fluid for actuation of said diaphragm, said separating wall having a port for establishing communication between said pressure and valve chambers, said separating wall having a second port for exhausting pressure fluid from said valve chamber; means for conducting pressure fluid to said pressure chamber; a pilot valve disc in said pressure chamber seated on the opposite face of said separating wall, said pilot valve disc having a passageway adapted to register with said first port to admit pressure fluid from said pressure chamber into said valve chamber to actuate said diaphragm to form a seal with said seat, said pilot valve disc having a second passageway for establishing communication between said first and second ports in said separating wall to exhaust pressure fluid from said valve chamber, thereby relieving the pressure on said diaphragm and permitting movement thereof away from said seat to establish communication between said inlet and outlet openings.

6. A valve comprising, a housing having inlet and outlet openings; a valve seat intermediate said openings; a diaphragm structure arranged to provide a seal with said valve seat, said diaphragm extending transversely of said housing and arranged to form one side wall of a valve chamber; a pressure chamber adjacent said valve chamber; a wall separating said pressure and valve chambers, one face of said separating wall confronting said diaphragm and forming another side wall of said valve chamber, said face having a recess therein to receive pressure fluid for actuation of said diaphragm, said separating wall having a port for establishing communication between said pressure and valve chambers, said separating wall having a second port for exhausting pressure fluid from said valve chamber; means for conducting pressure fluid from the inlet opening to said pressure chamber; a pilot valve disc in said pressure chamber seated on the opposite face of said separating wall, said pilot valve disc having a passageway positioned to register with said first port to admit pressure fluid from said pressure chamber into said valve chamber to actuate said diaphragm to form a seal with said seat, said pilot valve disc having a second passageway for establishing communication between said first and second ports in said separating wall to exhaust pressure fluid from said valve chamber, thereby relieving the pressure on said diaphragm and permitting movement thereof away from said seat to establish communication between said inlet and outlet openings.

7. A valve comprising, a housing having inlet and outlet openings; a valve seat intermediate said openings; a diaphragm having a renewable disc secured thereto and arranged to provide a seal with said valve seat, said diaphragm extending transversely of said housing and arranged to form one side wall of a valve chamber; a pressure chamber adjacent said valve chamber; a wall separating said pressure and valve chambers, one face of said separating wall confronting said diaphragm and forming another side wall of said valve chamber, said face having a recess therein to receive pressure fluid for actuation of said diaphragm, said separating wall having a port for establishing communication between said pressure and valve chambers, said separating wall having a second port for exhausting pressure fluid from said valve chamber; means for conducting pressure fluid to said pressure chamber; a pilot valve disc in said pressure chamber seated on the opposite face of said separating wall, said pilot valve disc having a transverse passageway positionable to register with said first port to admit pressure fluid from said pressure chamber into said valve chamber to actuate said diaphragm to form a seal with said seat, said pilot valve disc also having a U-shaped exhaust passageway for establishing communication between said first and second ports in said separating wall to exhaust pressure fluid from said valve chamber, thereby relieving the pressure on said diaphragm and permitting movement thereof away from said seat to establish communication between said inlet and outlet openings.

8. A valve comprising, one end section having inlet and outlet openings and a valve seat intermediate said openings; intermediate section means aligned with said end section to form a valve chamber; a diaphragm structure between said end section and said intermediate section means arranged to provide a seal with said valve seat; a second end section aligned with said intermediate section means and having a pressure chamber formed therein; said intermediate section means having a port extending therethrough for establishing communication between said pressure and valve chambers, said intermediate section means having a second port therein for exhausting pressure fluid from said valve chamber; means for conducting pressure fluid to said pressure chamber; a pilot valve having a passageway positionable to register with said first port to admit pressure fluid into said valve chamber to apply pressure to said diaphragm to provide a seal with said seat, said pilot valve having a second passageway for establishing communication between said first and second ports to exhaust the fluid from said valve chamber, thereby relieving the pressure on said diaphragm and establishing communication between said inlet and outlet openings.

9. A valve comprising, one end section having inlet and outlet openings and a valve seat intermediate said openings; intermediate section means aligned with said end section to form a valve chamber; a diaphragm structure between said end section and said intermediate section means carrying a renewable disc arranged to provide a seal with said valve seat; a second end section aligned with said intermediate section means and having a pressure chamber formed therein; means securing said end sections and said intermediate section means together; said intermediate section means having a port extending therethrough for establishing communication between said pressure and valve chambers, said intermediate section means having a second port therein for exhausting pressure fluid from said valve chamber; means for conducting pressure fluid to said pressure chamber; a pilot valve in said pressure chamber, said pilot valve having a passageway adapted to register with said first port to admit pressure fluid into said valve chamber to apply pressure to said diaphragm to close the valve, said pilot valve also having a U-shaped exhaust passageway for establishing communication between said first and second ports to exhaust the fluid from said valve chamber, thereby relieving the pressure on said diaphragm and allowing the valve to open.

DONALD G. GRISWOLD.